US010606623B2

(12) United States Patent
Ouyang et al.

(10) Patent No.: US 10,606,623 B2
(45) Date of Patent: Mar. 31, 2020

(54) CHARGEBACK SYSTEM AND METHOD USING CHARGEBACK DATA STRUCTURES

(71) Applicant: ORACLE INTERNATIONAL CORPORATION, Redwood Shores, CA (US)

(72) Inventors: Hui Ouyang, Highland Park, NJ (US); Srikanth Kurra, Andhra Pradesh (IN); Rakesh Nalluri, Belmont, CA (US); Narasiman Ramamoorthy, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/376,191

(22) Filed: Apr. 5, 2019

(65) Prior Publication Data

US 2019/0235891 A1 Aug. 1, 2019

Related U.S. Application Data

(63) Continuation of application No. 14/291,962, filed on May 30, 2014, now Pat. No. 10,296,361.

(51) Int. Cl.
*G06F 9/455* (2018.01)
*G06Q 10/06* (2012.01)
(Continued)

(52) U.S. Cl.
CPC ............ *G06F 9/455* (2013.01); *G06F 9/46* (2013.01); *G06F 9/5077* (2013.01);
(Continued)

(58) Field of Classification Search
None
See application file for complete search history.

(56) References Cited

U.S. PATENT DOCUMENTS 7,023,979 B1 * 4/2006 Wu ..................... H04M 3/5233
379/265.11
8,799,897 B2 * 8/2014 Katiyar ............... G06F 9/45533
718/1
(Continued)

OTHER PUBLICATIONS

VMware, Inc; VMware VCenter Chargeback Manager for IT Cost Management; downloaded on Apr. 22, 2014 from http://www.vmware.com/products/vcenter-chargeback, 2014, pp. 1-8.
(Continued)

*Primary Examiner* — Gurkanwaljit Singh
(74) *Attorney, Agent, or Firm* — Tarolli, Sundheim, Covell & Tummino LLP

(57) ABSTRACT

Systems, methods, and other embodiments associated with chargeback systems are described. In one embodiment, a chargeback application includes instructions for reading a data structure that defines at least attributes that identify a resource type and resource items of the resource type, and chargeback rules for calculating a cost for usage of the resource items. The data structure is parsed to identify the attributes and the chargeback rules. Chargeback functions of the chargeback application are configured based on at least in part the identified attributes and the chargeback functions are caused to retrieve metered data related to usage of the resource items in a computing system. The chargeback application translates the retrieved metered data in accordance with the chargeback rules to generate a usage cost for the resource items.

20 Claims, 5 Drawing Sheets

(51) Int. Cl.
*G06Q 30/02* (2012.01)
*H04M 3/523* (2006.01)
*G06F 9/50* (2006.01)
*G06F 9/46* (2006.01)
*G06Q 20/14* (2012.01)

(52) U.S. Cl.
CPC ....... *G06Q 10/0631* (2013.01); *G06Q 20/145* (2013.01); *G06Q 30/0283* (2013.01); *H04M 3/5233* (2013.01)

(56) References Cited

U.S. PATENT DOCUMENTS

| | | | | |
|---|---|---|---|---|
| 9,665,837 | B2* | 5/2017 | Garrison | G06Q 20/20 |
| 2002/0161717 | A1* | 10/2002 | Kassan | G06O 20/1085 |
| | | | | 705/59 |
| 2008/0167977 | A1* | 7/2008 | Auvenshine | G06F 9/5061 |
| | | | | 705/34 |
| 2010/0036698 | A1* | 2/2010 | Garrison | G06Q 10/06 |
| | | | | 705/16 |
| 2011/0077997 | A1* | 3/2011 | Agarwala | G06Q 30/04 |
| | | | | 705/7.35 |
| 2011/0078695 | A1* | 3/2011 | Agarwala | G06Q 10/06 |
| | | | | 718/104 |
| 2011/0161496 | A1 | 6/2011 | Nicklin | |
| 2012/0026646 | A1 | 2/2012 | Thielmann et al. | |
| 2012/0260248 | A1* | 10/2012 | Katiyar | G06F 9/45533 |
| | | | | 718/1 |
| 2015/0106245 | A1* | 4/2015 | Mirajkar | G06Q 30/0283 |
| | | | | 705/30 |

OTHER PUBLICATIONS

VMware, Inc; VMware vCenter Chargeback Manager Features; downloaded on Apr. 23, 2014 from http://www.vmware.com/products/vcenter-chargeback/features.html, 2014, pp. 1-5.

Oracle Corporation; Enterprise Manager 12c Cloud Control Metering and Chargeback, Oracle Enterprise Manager 12c; an Oracle White Paper, Apr. 2012, pp. 1-28; Redwood Shores, CA, USA; http://www.oracle.com/technetwork/oem/cloud-mgmt/wp-em 12c-chargeback-final-1585483.pdf.

Zeno Imaging; ImageWARE Enterprise Management Console; Canon—iWEMC Accounting Management Plug-In-Zeno Imaging; downloaded on Apr. 22, 2014 from http://zenoimaging.com/sw/swchannel/productcatalogcf_v2/internet/model.asp?ProductMasterID=2120206&ParentID=627099&SWID=1; pp. 1.

Archibus, Inc.; Archibus Applications, Space Chargeback; Streamline the chargeback process to increase space accountability and reduce occupancy costs; downloaded from www.archibus.com/index.cfm?circuit=document&template_id=609; pp. 1-2; 2009; Boston, MA, USA.

Hewlett-Packard Development Company, L.P.; HP CloudSystem Matrix: Collecting Usage Data for Show-back, Charge-back, and Billing Purposes; technical white paper; http://h18004.www1.hp.com/products/servers/docs/4AA3-8068ENW.pdf; pp. 1-21; Nov. 2011.

Pricewaterhousecoopers LLP; Financial Services Technology Journal, The Cost Management Issue; http://www.pwc.com/us/en/financial-services/assets/fs-tech-journal-cost-management.pdf; pp. 1-43; 2010.

Oracle Corporation; Oracle Enterprise Manager, Cloud Administration Guide, 12c Release 3 (12.1.0.3) E28814-10, Chapters 22 and 30 only; pp. 1-45; Oct. 2013.

* cited by examiner

```xml
<ChargebackMetadata name="oracle_apache" description="Chargeback meta data for host"
version="1.0"    xmlns:xsi="http://www.w3.org/2001/XMLSchema-instance">
<ChargebackResourceType name="oracle_apache" displayLabel="Oracle HTTP Server"
labelNlsId="name" description="Oracle HTTP Server chargeback resource type"
          descriptionNlsId=""  mappingEmresourceType="oracle_apache"
          resourceBundle="oracle.sysman.eml.rsc.chargeback.oracle_wlsMsg"
defaultUsageMode="metered" >
  <ChargeItems>
    <ChargeItem name="BaseCharge" displayLabel="Base Charge" type="fixed"
dataType="number" category="instance"    aggregationType="sum">
      <QueryExpression type="internal"></QueryExpression>
    </ChargeItem>
  </ChargeItems>
  <ChargeTemplates>
    <ChargeTemplate name="apacheMetered" displayLabel="Charge template for metering
http Apache server"
          labelNlsId="http_dedicated" description="Chargeback charge template for metering
Http Apache server"
          descriptionNlsId="meter_apache_desc" usageMode="metered"
isMaster="yes"></ChargeTemplate>
  </ChargeTemplates>
  <UsageModes>
    <UsageMode name="metered" displayLabel="Metered" labelNlsId="metered"
type="dedicated" isChargeable="yes"   isNavigational="no"
defaultChargeTemplate="apacheMetered"></UsageMode>
  </UsageModes>
 </ChargebackResourceType>
 <resourceCallbacks>
   <resourceCallback callbackProc="GC$CHARGEBACK.add_em_resource_cb"
type="addEmresource" resourceType="oracle_apache"/>
  </resourceCallbacks>
</ChargebackMetadata>
```

FIG. 3

CHARGEBACK SYSTEM AND METHOD USING CHARGEBACK DATA STRUCTURES

RELATED APPLICATIONS

This application is a continuation of U.S. application Ser. No. 14/291,962, filed on 30 May 2014, the entirety of which is incorporated herein by reference.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

In computing systems and networks, "chargeback" is used to allocate the costs of information technology (IT) resources to the people or organizations who consume them. The purpose of chargeback is to gather data on resource use, allocate charges for the use of these resources, and present the results in a comprehensible format. While it can be applied in situations where IT resources are dedicated, it is particularly relevant in situations where resources are shared. If there is not some way to meter and charge for consumption of resources, then there is a tendency for users to use more resources than they need. This problem is exacerbated in cloud environments where users are able to provision their own resources using self-service.

Because of its self-service provisioning and rapid elasticity, organizations are looking to exploit the benefits of cloud computing. The shift towards user-driven provisioning means that cloud users are able to consume resources without needing to seek approvals or provide any business justification. In order to ensure that cloud resources are used for activities that deliver business value, some organizations use a chargeback application for metering cloud resources and charging cloud users based on their consumption. Chargeback helps cloud users understand how their consumption of resources translates to a cost. This benefits cloud users as it enables them to adjust their consumption in order to control their IT costs. It also benefits the IT organization as it enables them to achieve higher utilization rates across their servers.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 3 illustrates one embodiment of a chargeback data structure.

DETAILED DESCRIPTION

Systems, methods, and other embodiments are disclosed herein that are associated with an extensible chargeback system for a computing system. In one embodiment, the chargeback system is configured as a customizable system that provides users with the ability to define what resources to meter and how to charge for the resources. The chargeback system is not limited by a predefined set of resources that is hardcoded in the software of the system. Rather, a chargeback data structure may be custom generated and configured to define any type of resource to be metered and to define customized rules for determining how to charge for the usage of the resources. Thus the chargeback system is configured to support chargeback for a heterogeneous set of resource-types.

As will be described herein, the chargeback system is configured to operate using the definitions from the chargeback data structure. Thus, in one embodiment, the chargeback system is easily extensible by generating new data structures with new resource/cost definitions or modifying existing chargeback data structures. In this manner, the executable code of the chargeback system can perform new chargeback functions without being reprogrammed and recompiled.

Previous chargeback applications have been programmed with predefined chargeback options that allow a user to select which resources from a pre-identified set of resources should be tracked and charged. The predefined chargeback options were hardcoded in the application and thus provided only a limited amount of resource types that could be selected for chargeback. If a customer wished to meter and charge a resource that was not predefined in the chargeback application, the resource could not be charged by the application. Instead, the customer could only make a request to the vendor of the chargeback application to revise the software and include the new resource as a new chargeback option.

To revise the software, the chargeback application needed to be reprogrammed with new options, recompiled, retested, and re-released as a new version of the software application. This revision process was time consuming and expensive. The process also could not accommodate the ever changing requests from different customers for different types of chargeback. The present chargeback system is extensible by using data structures that simplify the process of customizing chargeback without revising program code.

Figure 1:
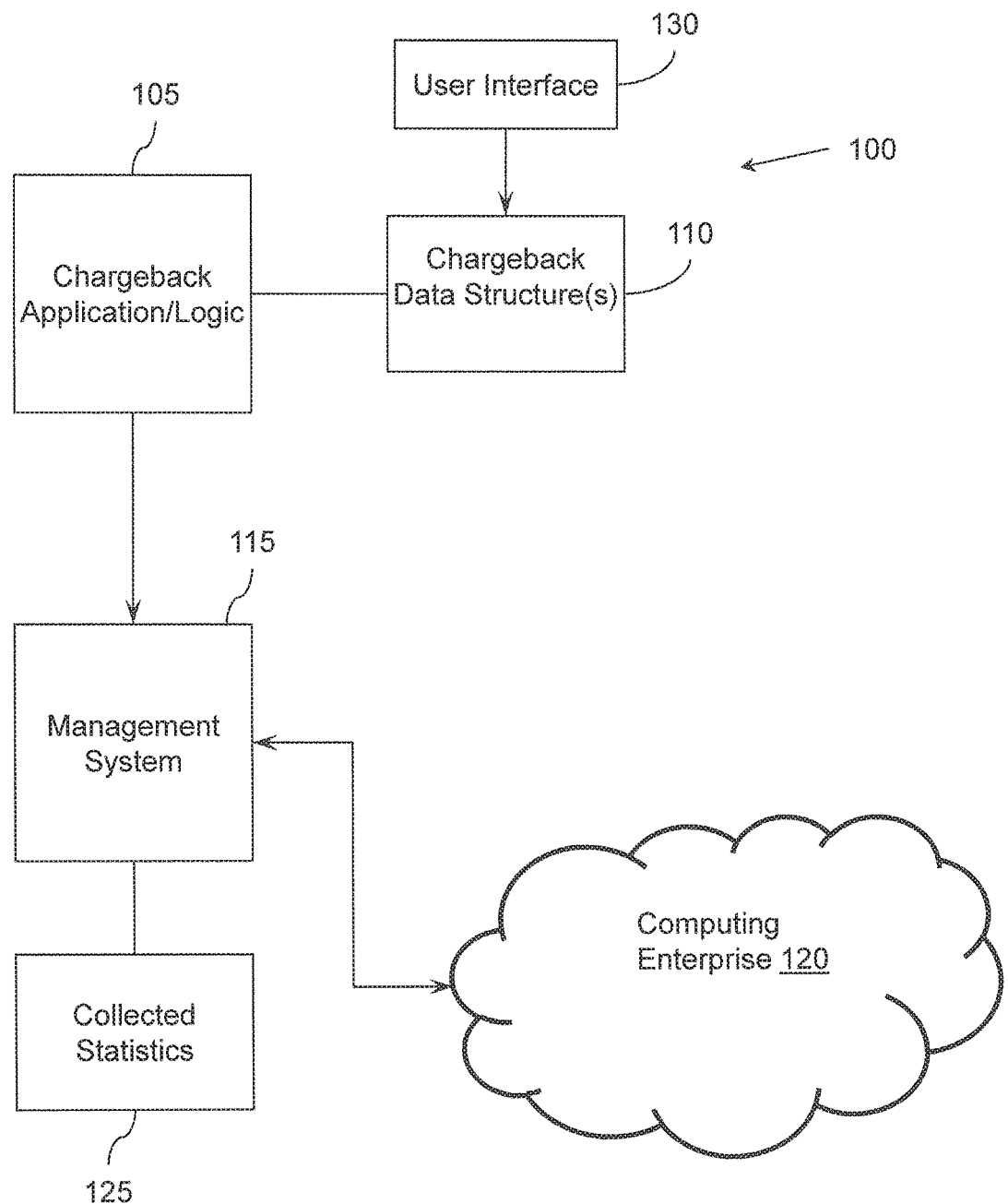
FIG. 1 illustrates one embodiment of a chargeback system in a computing environment.

With reference to FIG. 1, one embodiment of a computer-implemented chargeback system 100 that is associated with managing and computing charges for the usage of resources in a computing system. The chargeback system 100 includes a chargeback application/logic 105 and a chargeback data structure(s) 110. In one embodiment, the chargeback application 105 is executable code configured to perform management functions, computing functions, and reporting functions of the chargeback system 100. The chargeback data structure 110 is configured to provide definitions and rules to the chargeback application 105 for determining how the usage of an identified resource is charged. The operation of the chargeback application 105 and its functionality is modifiable and thus extensible by generating new data structures 110 that have different chargeback definitions and/or rules. For example, the functionality is changed in response to receiving a new data structure (or a modified data structure) that is submitted to the system 100 and processing chargeback functions from the application 105 based on the new data structure.

In one embodiment, the chargeback application 105 is part of a computer system that includes a management system 115. For example, the chargeback application 105 may be configured as a plug-in to the management system 115 or may be directly implemented therein. In one embodiment, the management system 115 is an administrative tool (e.g., a set of applications) for managing software and hardware components of a computing enterprise 120. In one embodiment, the computing enterprise 120 may be a cloud computing system with software, platforms and shared infrastructure, or any type of distributed network.

In general, the computing enterprise 120 includes a collection of resources/assets that are available for use by users and operate within the enterprise. The management system 115 includes interfaces and tracking tools for monitoring and collecting statistics associated with the operation and usage of many aspects of the computing enterprise 120 including its resources. In one embodiment, the management system meters the usage of resources from the computing enterprise 120, collects statistical data about the resources, and stores the data as collected statistics 125 in a storage device. Examples of resources include but are not limited to servers, processors, databases, database features, storage devices, memory, applications (e.g., there may be thousands of applications), application features, printers, cell phones, software tools/utilities, and so on. Chargeback also allows user activities to be metered and charged, such as a number of service requests made, an amount of database searches requested, a number of times an application function is requested, activities that consume a resource, etc. Virtually anything that can be used in a computing environment may be a "resource" to some customer.

In order to calculate usage costs of a resource from the metered data, the resource needs to be identified to the chargeback application 105. Since anything may be a "resource," it is not practical to hardcode a large catalog of possible resources in the chargeback application 105. Furthermore, a resource may be a type of entity that includes many different sub-resources or items, any of which may be identified for chargeback. Thus, a resource may include a hierarchy of relationships with sub-resources, which are components that make up the resource. To identify a particular resource for chargeback, the hierarchy may be included to tell the system how and where to find usage data associated with the resource.

One example of a resource hierarchy is illustrated with reference to FIG. 2. Suppose one resource type is a financial application. It is noted that the resource type may be regarded as an "entity type" since this refers to a larger category of resources which fall under the specified entity. For example, the financial application uses other computer resources (e.g., sub-resources) such as hardware, software tools, a database, peripherals, etc. during the operation of the financial application. Each of the sub-resources may include their own sub-resources such as the hardware resource may include a processor, storage, and memory. The software tools may include a variety of different available features F1, F2 . . . FN that are available for use, each of which may be identified for chargeback purposes. The peripherals resource may include cell phones, laptops, or other devices for accessing and using the financial application. Of course, other resources may be included.

Each resource may have specific "items" at the end of the hierarchy relating to how the resource is used or a particular thing that is used. The items may include specific usage data about some characteristic that can be measured with some unit of measure. For example, the cell phone may include a number of usage minutes and volume of network data used (e.g., GB used). The laptop may include a volume of downloaded data (e.g., GB), or other type of parameter that may be relevant to a customer about how the laptop is used. In general, the "charge item" defines what kind of item data will be collected and how the data is going to be collected.

It should be evident that there is a vast amount of possible resources and usage items in any given computing system. Adding to the complexity in terms of chargeback, different customers may wish to have different charge rates and rules for the usage of each item. For example, customer X may wish to charge $0.10/minute of cell phone use but customer Y wants to charge $0.15/minute. As with hardcoding the chargeback application 105 with all possible resources, it is not practical or even possible to hardcode all the possible ways to compute costs for the usage of each possible resource/item to accommodate all customers. Hardcoding such a quantity of optional features into core software makes the core heavier and eventually it will lose the benefit of being a plug-in application for the management system 115.

Accordingly with reference again to FIG. 1, rather than hardcoding all possible chargeback options, the chargeback application 105 is configured with generic logic that operates based on the chargeback data structure 110. In one embodiment, the chargeback application 105 is hardcoded with undefined logic that is configurable by attributes/rules from the chargeback data structure 110 to perform defined chargeback functions. Thus the chargeback application 105 can be customized based on at least different chargeback data structures 110 that have different cost definitions and/or cost rules and implementing the cost definitions and cost rules to calculate customized usage costs.

In one embodiment, different and separate chargeback data structures 110 may be generated and stored, which define customized chargeback rules for different resources. Thus there may be many different data structures 110 defined that are used by the chargeback application 105 to calculate many different chargeback options. In some embodiments, the chargeback data structure 110 is remotely stored from the chargeback application 105 and/or may be generated by an application separate from the chargeback application 105.

In one embodiment, the chargeback data structure 110 (and any objects like a charge plan) may be generated via a user interface 130. For example, user interface 115 may be a command line interface or a text editor that is used to generate the chargeback data structure 110 (and any objects) as a text file (e.g., non-executable). In some embodiments, the text file may be an XML document, an HTML document, a table of definitions, or other type of free-form data structure that defines chargeback attributes, instructions calculating charges, and/or allocation rules for allocating costs to entities.

In one embodiment, a predefined syntax of tags or labels is used to define the attributes/parameters of the chargeback data structure 110 and designate their associated values. Knowing the predefined syntax, the chargeback application 105 is configured to read the data file/document, parse the contents of the file, and identify the tags in the data structure 110 in order to determine the associated values, which are then used to configure the chargeback functions of the chargeback application 105. The predefined syntax is schema that identifies the resources and the items to be processed for chargeback.

With reference to FIG. 3, one embodiment of a chargeback data structure 300 is illustrated that is configured as an XML document. Data structure 300 is one type of data structure that may be created. Of course, different types of data structures may be configured that include different formats and/or content to define customized chargeback attributes/parameters. In some embodiments, the data structure is defined by an administrator of the system.

With reference to the chargeback data structure 300, a variety of predefine tags may be used to designate customizable attributes such as "Chargeback Resource Type," "Charge Items," "Charge Templates," "Usage Modes," and/or "Entity Callbacks." Of course, other types of tags may be defined for other types of chargeback attributes. In one embodiment, a user with knowledge of the predefined syntax would be responsible for generating customized data structure documents 300 and registering the data structure document with the chargeback system 100. For example, the user may be a system administrator or integrator that is responsible for configuring and setting up the chargeback system 100.

In one embodiment, the tags may be configured as follows, but of course, other configurations and definitions may be implemented:

"Chargeback Resource Type" is a representative model for resource type or component type that is used by the management system's 115 resource type to be metered. A resource type may have one or more usage modes, within each usage mode, a parent-child relationship with other chargeback resource types can be defined. The chargeback resource type that is metered directly may have multiple charge items defined (e.g., sub-components).

"Usage Mode" defines, for example, whether the resource type is going to be metered directly or metered through other member resource types, and how they are metered or metered on which charge items. One chargeback resource type can have different usage modes for different usage situations.

"Charge template" defines, for example, that the chargeback resource type is metered through specified charge items. For each usage mode related with direct metering, it may have one charge template. For the composite/parent chargeback resource types, if there is no charge item defined directly on the composite/parent resource type, a charge template is not needed. A charge item may still be defined in composite/parent chargeback resource types, so a charge template may be used. A master chargeback template may be created that contains all the charge items defined for a chargeback resource type, so there is no need to define the item list for it. For other non master template, the list of the charge items included in the charge template may be defined in the chargeback data structure.

Figure 2:
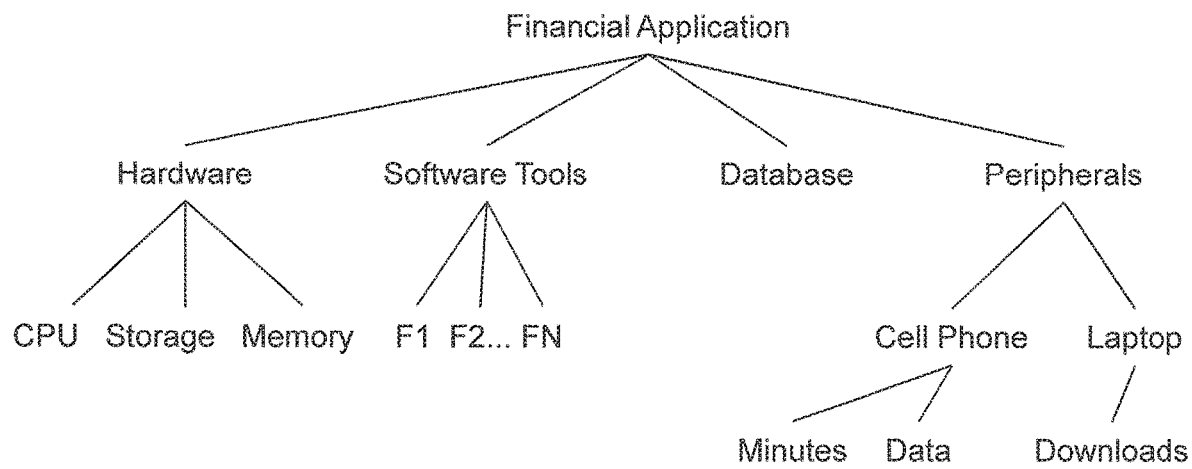
FIG. 2 illustrates one embodiment of a tree structure that represents a hierarchy of resources.

"Charge item" defines, for example, what kind of item data will be collected and how the data is going to be collected (see FIG. 2 for examples). The charge item may be based on a configuration, a property, or a metric of a target resource that the management system 115 is metering. In other embodiments, the charge item may be just a fixed charge item.

With reference again to FIG. 1, in another embodiment, the user interface 115 is a graphical user interface configured to graphically request input values from a user via a display device. In one embodiment, the user interface is configured to receive, in one or more fields via the display device, one or more input parameters corresponding to one or more of: a custom resource type, a custom resource item of the resource type, custom data sources to meter, customer chargeback rules for translating metered usage data into cost, and/or custom chargeback rules for allocating the cost of metered usage data to entities. The user interface 130 (or the chargeback application 105) may be configured to generate a chargeback data structure based on, at least in part, the one or more input parameters. For example, the graphical user interface is configured to generate the chargeback data structure in accordance with the predefined syntax and populate the data structure with the received input parameters/values. In this manner, the user does not need to know the syntax of the data structure 110 since the graphical user interface programmatically associates the input values with the predefined syntax of tags to build the data structure 110.

In general, the chargeback data structure 110 is a mechanism that allows a chargeback profile to be user-defined including user-defined resources, properties, and/or resource relationships that are not selected from a limited hardcoded list of predefined options. The chargeback data structure 110 also allows user-defined metering rules and/or cost rules (e.g., rates, weights, formulas, etc.) that operate to process the resources, properties, and resource relationships to determine a total cost for the use of identified resources. Thus, a user may introduce new resource types, new resources, and new cost formulas into the chargeback system 100 that are not predefined by the chargeback application 105 and without requiring the chargeback application 105 to be reprogrammed and recompiled.

In one embodiment, various parameters that are described as part of the data structure 110 may be defined in an "object" of the data structure. For example, once a data structure 110 is generated for an identified resource type, one or more objects (e.g., other data structures) may be generated for defining additional parameters, charge rules, and/or conditions for charging. A charge plan for a resource type may be defined separately as an object that includes values/rules for different charge rates, allocation weights, and so on for different charge items that are sub-components in that resource type. In one embodiment, the data structure 110 includes an attribute that identifies the charge plan object, which the chargeback application 105 uses to locate and retrieve the parameters from the charge plan. In another embodiment, each charge plan is associated with a chargeback data structure by identifying the resource type that the charge plan belongs to using a parameter/tag in the charge plan. Other types of data may also be defined in an object.

The chargeback application 105 is configured to use the chargeback data structure 110 as follows, in one embodiment. With continued reference to FIG. 1, recall that the management system 115 collects large amounts of statistical data relating to the operation of the computing enterprise 120 (e.g., thousands of properties of metered data from the usage of resources). The metered data is stored as collected statistics 125 in a data base or other storage device.

In one embodiment, the chargeback application 105 uses the information from the chargeback data structure 110 to locate metered data from the collected statistics 125 that corresponds to the identified resources/items for chargeback. The chargeback application 105 may then pull the metered data for the identified resource/item from the collected statistics 125 of the computing enterprise 120 and process the metered resource/item data using the chargeback rules from the data structure 110 to calculate a usage cost.

In some situations, the data structure 110 may define multiple different types of items to be processed for chargeback for a cost center (e.g., entity to be allocated the usage cost). The different types of items may have different units of measure, which are not combinable and thus cannot be simply added together to determine a total chargeback cost. For example, different types of items may be: an amount of space used in a disk drive (gigabytes); an amount of CPU time used (milliseconds); a number of queries submitted to a database (integer value); etc. Each of these items has different units of measure that are not compatible for direct combination.

Since the different types of items are user-defined in the chargeback data structure 110, the data structure 110 can also be configured by the user to include user-defined rules for translating or aggregating the collected statistics and the different units of measure to normalized values with a common unit type. These rules cause the chargeback application 105 to operate with customized functionality that is not hardcoded in the application. After translating the incompatible units, the normalized values can then be combined according to defined cost rates, weights, or other cost formulas into a single total cost. The total cost may be allocated to a single cost center or allocated among different cost centers using the normalized values in accordance with rules defined in the chargeback data structure 110. Thus the chargeback data structure 110 may include custom rules for allocating the chargeback costs to one or more entities (e.g., cost centers). The allocation rules may also be configured to identify custom cost centers, where the cost centers are not predefined by the chargeback application 105.

Figure 4:
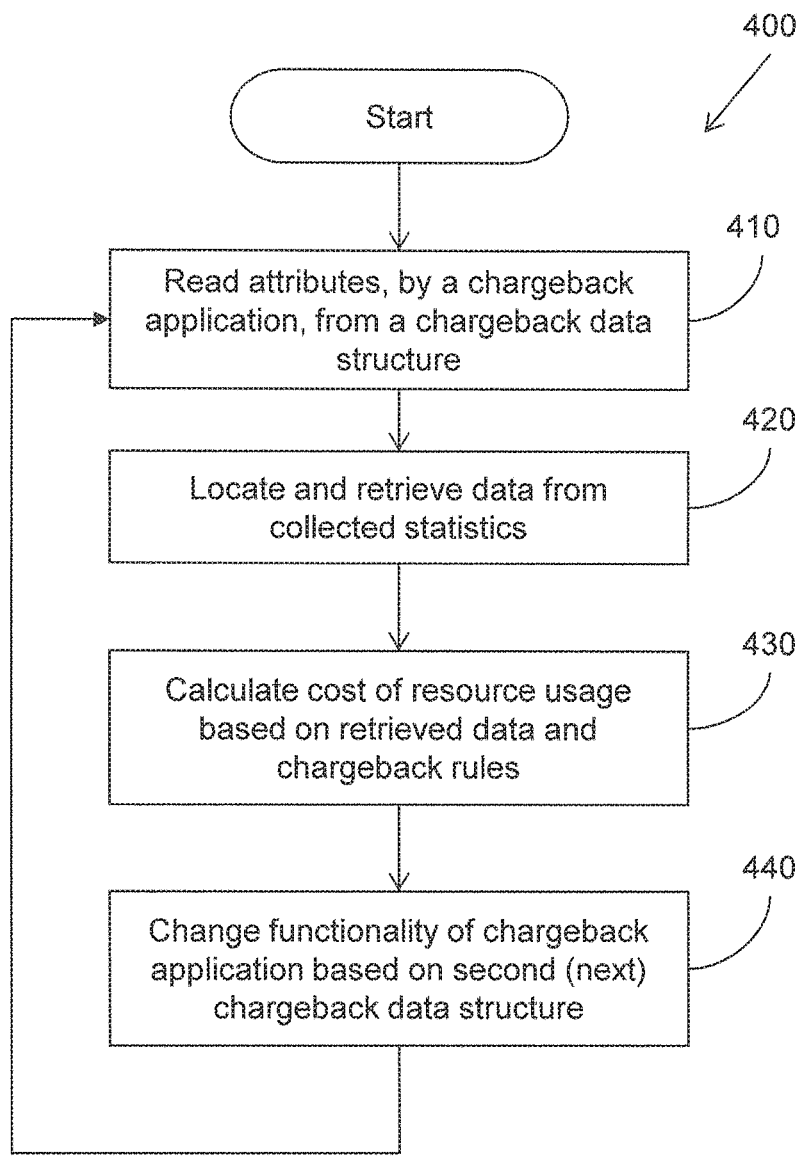
FIG. 4 illustrates an embodiment of a method associated with performing chargeback calculations using a chargeback data structure.

With reference to FIG. 4, one embodiment of a computer-implemented method 400 is illustrated that is associated with an extensible chargeback system. Method 400 is described in view of the system configuration shown in FIG. 1 thus similar components with be referenced. Additionally, method 400 is described from the view point of the chargeback application 105 and its operations.

The method 400 is initiated by, for example, a request to calculate a chargeback for one or more resources or by a trigger event such as a new or modified chargeback data structure being received by the system. Once initiated, at 410, the chargeback application reads attributes from a first chargeback data structure that is associated with the request or trigger event. From the attributes, the chargeback application identifies at least (i) resources to be charged and (ii) chargeback rules for computing a cost for usage of the resources. For example, the chargeback rules include custom rules for translating metered usage data into costs.

As described previously, the contents of the data structure may be parsed and analyzed for predefined tags that designate values for various attributes, which include the identified resources and chargeback rules. Other attributes may be present in the chargeback data structure 110 as described previously or as desired. Other attributes may include custom rules for allocating the calculated usage costs to entities (e.g., cost centers, departments, etc.). For example, the usage cost for a resource may be allocated to a single entity or allocated to multiple entities based on a formula or ratio, which would be defined in the data structure.

In another embodiment, if chargeback data structure identifies one or more objects such as a charge plan (as previously described), then the method includes retrieving parameters from the object and performing the chargeback process in accordance with the parameters. A charge plan may include, for example, particular rates or charge costs associated with one or more resource items that are sub-components of the resource type as defined in the chargeback data structure.

At 420, data corresponding to the resources identified in the chargeback data structure are located and retrieved from, for example, the database of collected statistics 125 that includes data metered from operations of the computing enterprise 120. In another aspect, the chargeback application may be configured to meter specific data from the computing enterprise 120 based on instructions from a chargeback data structure and store the metered data in the database of collected statistics 125 or other location.

At 430, a cost for usage of the resources is calculated based on the retrieved metered data and the chargeback rules from the first chargeback data structure. Other types of processing may be performed as previously described such as translating the statistics into normalized values and applying cost rates (specified by the data structure) to determine a total cost for the usage of an identified resource.

At 440, the functionality of the chargeback application is changed based on at least a second (the next) chargeback data structure that identifies different resources to be charged and/or different chargeback rules. The method is then repeated for the new (next) chargeback data structure and may continue by processing one or more additional data structures that may be defined.

As previously explained, the functionality of the chargeback application may be changed by processing different chargeback data structures that have different cost profile attributes. Thus the change is accomplished without reprogramming or recompiling the chargeback application. In one embodiment, the chargeback data structure is generated with user-defined attributes that allow a user to define a custom resource type that is not predefined by the chargeback application. Thus the chargeback application is not restricted by hardcoded resource types that are predefined in the application.

In another embodiment, the method 400 may include actions for generating the chargeback data structure. For example, a user interface that includes one or more fields is displayed via a display device. The one or more fields are configured for receiving one or more input parameters corresponding to the attributes of the chargeback data structure. In one embodiment, the input parameters may include one or more of: a custom resource type, a custom resource item of the resource type, custom data sources to meter, customer chargeback rules for translating metered usage into a cost, or custom chargeback rules for allocating the cost from metered usage data to identified entities. The chargeback data structure is then generated based on, at least in part, the one or more input parameters and may be generated in accordance with a predefined syntax as previously described.

Overall, the disclosed chargeback system provides a flexible and extensible framework for adding customizable features and/or functionality to chargeback operations without compiling time dependency. This maintains the core framework of the application as a light core with only the required framework features in a generic way.

Computer Embodiment

Figure 5:
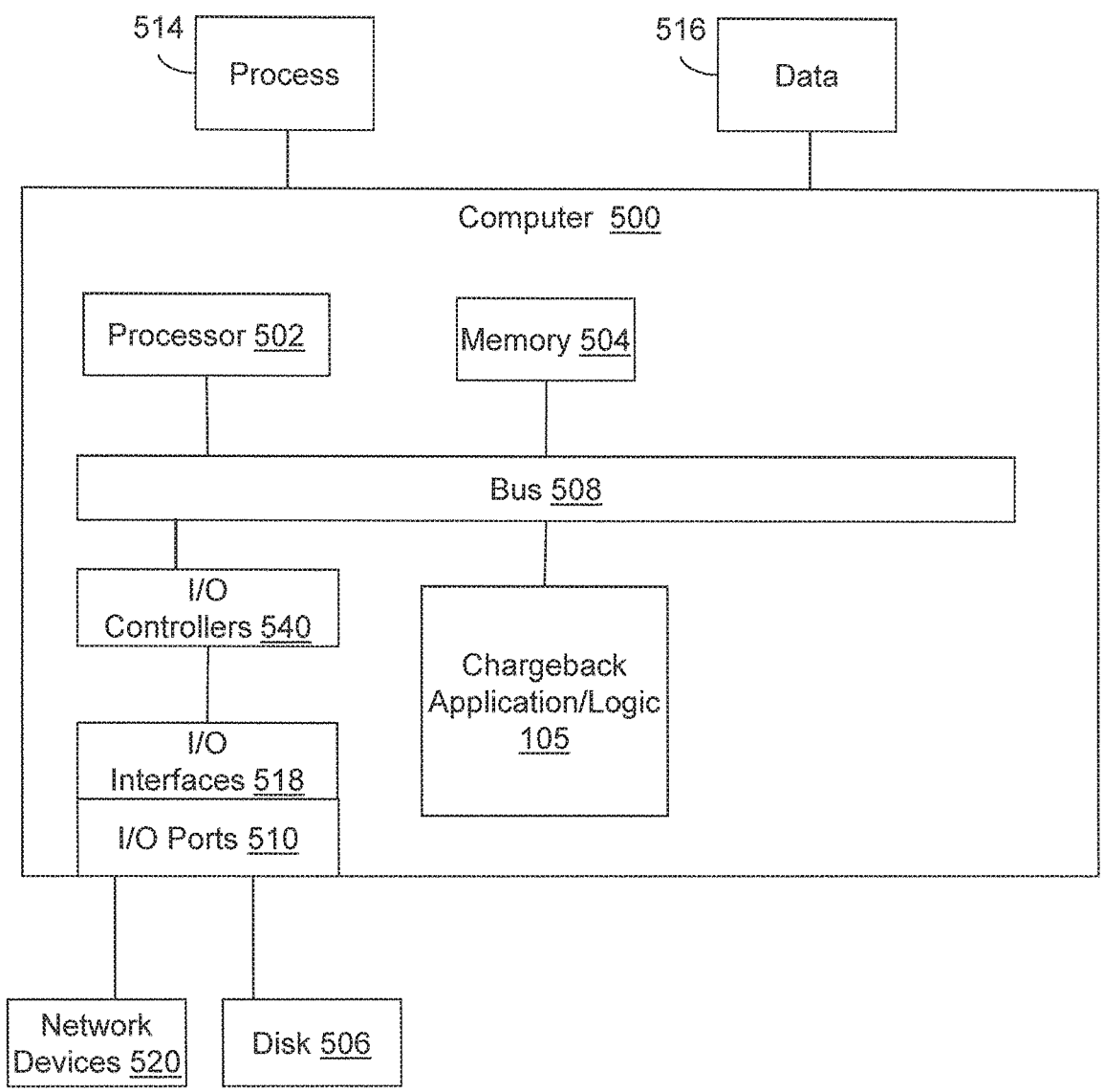
FIG. 5 illustrates an embodiment of a computing system configured with the example systems and/or methods disclosed.

FIG. 5 illustrates an example computing device that is configured and/or programmed with one or more of the example systems and methods described herein, and/or equivalents. The example computing device may be a computer 500 that includes a processor 502, a memory 504, and input/output ports 510 operably connected by a bus 508. In one example, the computer 500 may include the chargeback application/logic 105 configured to facilitate the customizable chargeback system 100 as described with references to FIGS. 1-4. In different examples, the chargeback logic 105 may be implemented in hardware, a non-transitory computer-readable medium with stored instructions, firmware, and/or combinations thereof. While the chargeback logic 105 is illustrated as a component attached to the bus 508, it is to be appreciated that in other embodiments the chargeback logic 105 could be implemented in the processor 502, stored at least in part in memory 504, and/or stored on a storage device (e.g., disk 506). The disk 506 or other storage device may store one or more of the chargeback data structures 110 (shown in FIG. 1).

In one embodiment, chargeback logic 105 or the computer 500 is a means (e.g., structure: hardware, non-transitory computer-storage medium, firmware) for performing the actions and functions disclosed.

The means may also be implemented as stored computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with input/output devices via the I/O interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, fewer blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"XML" refers to an extensible markup language.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform any function(s) or an action(s) disclosed herein, and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions the computer-executable instructions, when executed causing a computing platform to:
    read, by the chargeback application, a data structure that defines a set of attributes that identify a resource type and resource items of the resource type, and chargeback rules for calculating a first cost for usage of the resource items;
    parse, by the chargeback application, the data structure to identify the attributes and the chargeback rules;
    configure, by the chargeback application, chargeback functions of the chargeback application based on at least in part the identified attributes and causing the chargeback functions to retrieve metered data from collected statistics related to usage of the identified resource items in a computing system;
    translate, by the chargeback application, the retrieved metered data in accordance with the chargeback rules to generate the first usage cost for a first usage of the identified resource items defined by the set of attributes;
    modify, via a user interface, a subset of the set of attributes of the data structure that identify a resource type and resource items of the resource type, wherein the modified subset of the set of attributes is user-defined; and
    translate, by the chargeback application, the retrieved metered data in accordance with the chargeback rules to generate a second usage cost for a second usage of the identified resource items that includes at least one of the user-defined resource items identified by the modified subset of the set of attributes of the data structure.

2. The non-transitory computer-readable medium of claim 1, further comprising computer-executable instructions that cause the computing platform to read translation rules from the chargeback data structure wherein the translation rules define rules for translating different units of measure from different types of resource items into normalized values with a common unit type.

3. The non-transitory computer-readable medium of claim 1, further comprising computer-executable instructions that cause the computing platform to display of a user interface having one or more fields for one or more input parameters corresponding to a custom resource, wherein the custom resource is user-defined based on the one or more input parameters.

4. The non-transitory computer-readable medium of claim 1, wherein the chargeback application is configured with functionality that computes usage costs of resources, wherein the functionality is extended in response to processing different data structures.

5. The non-transitory computer-readable medium of claim 4, wherein the chargeback functions of the chargeback application are modified in response to receiving and processing a second data structure that identifies different resources items to be charged and different chargeback rules.

6. The non-transitory computer-readable medium of claim 5, wherein the chargeback application changes the functionality, without reprogramming or recompiling the chargeback application, in response to processing the second chargeback data structure.

7. A method comprising:
    reading, by a chargeback application executing on a computing platform, a data structure that defines a set of attributes that identify a resource type and resource items of the resource type, and chargeback rules for calculating a first cost for usage of the resource items;
    parsing, by a chargeback application executing on a computing platform, the data structure to identify the attributes and the chargeback rules;
    configuring, by a chargeback application executing on a computing platform, chargeback functions of the chargeback application based on at least in part the identified attributes and causing the chargeback functions to retrieve metered data from collected statistics related to usage of the identified resource items in a computing system;
    translating, by a chargeback application executing on a computing platform, the retrieved metered data in accordance with the chargeback rules to generate the first usage cost for first usage of the identified resource items defined by the set of attributes;
    modifying, via a user interface, a subset of the set of attributes of the data structure that identify a resource type and resource items of the resource type, wherein the modified subset of the set of attributes is user-defined; and
    translating, by the chargeback application, the retrieved metered data in accordance with the chargeback rules to generate a second usage cost for a second usage of the identified resource items that includes at least one of the user-defined resource items identified by the modified subset of the set of attributes of the data structure.

8. The method of claim 7, further comprising reading, by the chargeback application, translation rules from the chargeback data structure wherein the translation rules define rules for translating different units of measure from different types of resource items into normalized values with a common unit type.

9. The method of claim 7, further comprising displaying, by the chargeback application, a user interface that has one or more fields for users to input one or more input parameters corresponding to a custom resource, wherein the custom resource is user-defined based on the one or more input parameters.

10. The method of claim 7, further comprising:
extending the functionality of the chargeback application in response to processing different data structures; and
computing, by the chargeback application usage costs of resources based on functionality of the chargeback application.

11. The method of claim 7, further comprising modifying, by the chargeback application, the chargeback functions of the chargeback application in response to the chargeback application processing a second data structure that identifies different resources items to be charged and different chargeback rules.

12. The method of claim 7, further comprising changing the functionality of the chargeback application, without reprogramming or recompiling the chargeback application, in response to processing the second chargeback data structure.

13. A computing system, comprising:
a non-transitory memory that stores data and machine readable instructions; and
a processor that accesses the memory and executes the machine readable instructions, the machine memory comprising:
a data structure that defines a set of attributes that identify a resource type and resource items of the resource type, and chargeback rules for calculating a first cost for usage of the resource items; and
a chargeback application that parses the data structure to identify the attributes and the chargeback rules and configures chargeback functions of the chargeback application based on at least in part the identified set of attributes and causes the chargeback functions to retrieve metered data from collected statistics related to usage of the identified resource items in a computing system, wherein the chargeback application translates the retrieved metered data in accordance with the chargeback rules to generate the first usage cost for a first usage of the identified resource items defined by the set of attributes; and
a user interface that enables a user to modify a subset of the set of attributes of the data structure that identify a resource type and resource items of the resource type, wherein the modified subset of the set of attributes is user-defined;
wherein the chargeback application translates the retrieved metered data in accordance with the chargeback rules to generate a second usage cost of the identified resource items that includes at least one of the user-defined resource items identified by the modified subset of the set of attributes of the data structure.

14. The computing system of claim 13, wherein the chargeback application reads translation rules from the chargeback data structure wherein the translation rules define rules for translating different units of measure from different types of resource items into normalized values with a common unit type.

15. The computing system of claim 13, wherein the chargeback application displays a user interface having one or more fields for one or more input parameters corresponding to a custom resource, wherein the custom resource is user-defined based on the one or more input parameters.

16. The system of claim 13, wherein the chargeback application:
extends the functionality of the chargeback application in response to processing different data structures; and
computes usage costs of resources based on functionality of the chargeback application.

17. The system of claim 13, wherein the chargeback application:
changes the functionality of the chargeback application, without reprogramming or recompiling the chargeback application, in response to processing the second chargeback data structure.

18. The non-transitory computer-readable medium of claim 1, wherein the chargeback rules are modified, via the user interface, to become user-defined rules for translating the metered data to generate a cost.

19. The method of claim 7, wherein the chargeback rules are modified, via the user interface, to become user-defined rules for translating the metered data to generate a cost.

20. The computing system of claim 13, wherein the chargeback rules are modified, via the user interface, to become user-defined rules for translating the metered data to generate a cost.

* * * * *